United States Patent Office 3,021,858
Patented Feb. 20, 1962

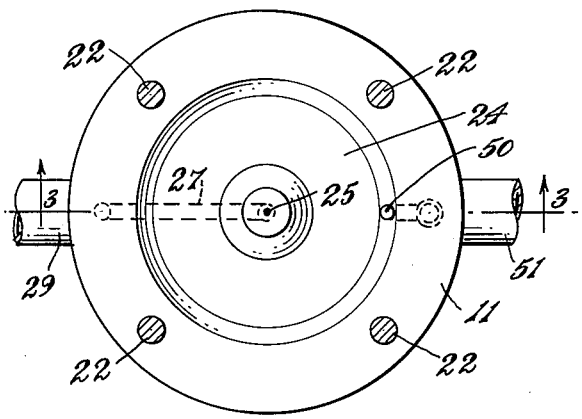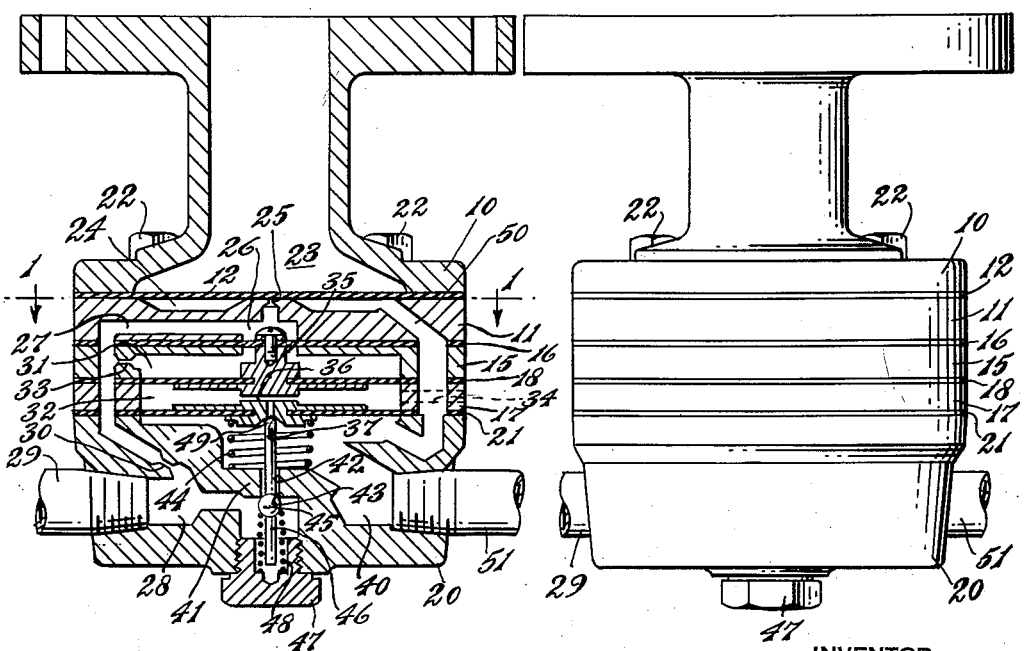

3,021,858
FLUID PRESSURE TRANSMITTERS
David B. Kirk, Oreland, Pa., assignor to Moore Products Co., Philadelphia, Pa., a corporation of Pennsylvania
Filed July 20, 1960, Ser. No. 44,081
5 Claims. (Cl. 137—85)

This invention relates to fluid pressure transmitters and more particularly to fluid pressure transmitters for the transmission of a fluid pressure of a value determined by or related to a measured or process pressure.

It has heretofore been proposed to measure and transmit pneumatically the pressure of a process fluid by using a diaphragm at one of the faces of which the process fluid is applied and to the opposite face of which an air pressure is applied which is controlled by the diaphragm position so that the air pressure is at all times substantially equal to the process pressure.

In arrangements of htis type heretofore available, if the diaphragm is highly flexible there is a tendency or likelihood of the system to oscillate continuously. This condition is particularly troublesome if the process pressure fluid is a liquid confined in a pipe such that there is a large inertia coupled to the diaphragm.

In an effort to obtain stability in such systems, it has heretofore been proposed to employ relatively stiff diaphragms or to employ volume chambers in the transmitted pressure line.

It is the principal object of the present invention to provide a fluid pressure transmitter having a pressure balancing circuit for establishing the value of the transmitting fluid substantialy equal to the process pressure fluid in a system which is free from objectionable oscillation.

It is a further object of the present invention to provide a fluid pressure transmitter having a pressure balancing circuit which is free from objectionable oscillation and does not require the use of volume chambers in the transmitted pressure line.

It is a further object of the present invention to provide a pressure transmitter with which highly flexible diaphragms can be employed without objectionable oscillation.

It is a further object of the present invention to provide a pressure transmitter of the diaphragm type which is particularly suitable for use with liquids and slurries and which will have greater stability under conditions of inertial load than pressure transmitters heretofore available.

Other objects and advantageous features of the invention will be apparent from the description and claims.

The nature and characteristic features of the invention will be more readily understood from the following description, taken in connection with the accompanying drawings forming part thereof, in which:

FIGURE 1 is a horizontal sectional view of a pressure transmitter in accordance with the invention, taken approximately on the line 1—1 of FIG. 3;

FIG. 2 is a side elevational view of the pressure transmitter in accordance with the invention; and FIG. 3 is a diagrammatic view of a pressure transmitter in accordance with the invention and taken substantially along the line 3—3 of FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated, an upper housing section 10 is provided having disposed immediately therebelow a nozzle housing section 11. A process pressure responsive or measuring diaphragm 12 is interposed between the housing section 10 and the nozzle housing section 11 and is clamped at its periphery between the housing sections 10 and 11.

The diaphragm 12 for use with the apparatus of the present invention can be made of any desired highly flexible material, resistant to the action of the fluids in contact therewith, and can include textile fabric coated with neoprene or other suitable synthetic plastic material, or sheet material of Teflon or other suitable synthetic plastic material.

An upper intermediate housing section 15 is provided and a diaphragm 16 is interposed between the section 15 and the section 11. A lower intermediate housing section 17 is provided and a diaphragm 18 is interposed between the section 17 and the section 15.

A valve housing section 20 is also provided and a diaphragm 21 is interposed between the section 20 and the section 17.

The housing sections 10, 11, 15, 17 and 20 are preferably disposed in a stack arrangement and are secured together in any desired manner, such as by through bolts 22.

The housing section 10 is interiorly shaped to provide a chamber 23 within which the process pressure is effective on the upper face of the measuring diaphragm 12. The housing section 11 is provided with an intermediate chamber 24 in which pressure is effective against the lower face of the measuring diaphragm 12. The housing section 11 has a central nozzle 25 communicating with the chamber 24 and with a chamber 26 in the housing section 11 having a predetermined area effective on the upper face of the diaphragm 16.

A passageway 27 extends to the chamber 26 through the housing sections 20, 17, 15 and 11 and is in communication with a chamber 28 in the valve housing section 20 to which a fluid supply pipe 29 is connected. An entrance restriction 30 is interposed in the passageway 27 beyond the chamber 28. The fluid supply pipe 29 is connected to any suitable source of pressure regulated and filtered fluid, such as air.

The upper intermediate housing section 15 and the lower intermediate housing section 17 have interior chambers 31 and 32 so that the effective areas of the diaphragm 18 and the diaphragm 21 are equal.

The chamber 31 in the housing section 15 is preferably in communication with the passageway 27 through a stabilizing restriction 33 for delaying the application of changes in the pressure in the chamber 26 within the chamber 27.

The housing 17 is provided with an exhaust passageway 34 in communication with the atmosphere for the discharge of pressure fluid from the chamber 32. The diaphragms 16, 18 and 21 are connected at their central portions for simultaneous movement by a diaphragm connector 35 which has a passageway 36 therethrough for establishing communication between the chamber 32 and a chamber 40 in the valve housing section 20 and has a valve seat 37 at the lower part thereof.

The chamber 40 is separated from the chamber 28 by a wall 41. A port 42 extending through the wall 41 has a valve seat 43 at the lower end thereof.

The connector 35 and the diaphragms 16, 18 and 21 connected thereto are normally urged upwardly by a helical spring 44 in the chamber 40 which is in engagement at its upper end with the diaphragm connector 35 and at its lower end with the upper face of the wall 41.

Within the chamber 28 a valve plug 45, preferably in the form of a ball, is provided mounted on a stem 46 for engagement with the valve seat 43. The valve housing 20 has a closure plug 47 for the chamber 28 which is provided with an interior opening for the reception of one end of a spring 48, the other end of which is in engagement with the valve plug 45 and tends to urge the plug 45 to seated position with respect to the valve seat 43.

The valve stem 46 extends through the port 42 and has an end portion 49 for engagement by the valve seat 37.

A passageway 50 extends from the chamber 40 through the housing sections 20, 17, 15 and 11 to the chamber 24 for applying the transmitted pressure in the chamber 24 and on the underside of the diaphragm 12.

The chamber 40 has an output fluid pressure connection 51 in communication therewith for the delivery of the output or transmitted pressure.

The mode of operation will now be pointed out.

Assume that the process pressure is effective in the chamber 23 and against the upper face of the diaphragm 12 and that fluid under pressure is supplied through the supply connection 29 to the chamber 28. From the chamber 28 pressure fluid is available through the restriction 30 and the passageway 27 to the chamber 26 against the upper face of the diaphragm 16 and discharges through the nozzle 25 as determined by the positioning of the diaphragm 12 with respect to the nozzle 25. The pressure effective in the passageway 27 is also effective through the restriction 33 to the chamber 31.

The diaphragm assembly, including the diaphragms 16, 18 and 21, is positioned by the pressure effective thereon and in turn controls the positioning of the valve stem 46 and the valve plug 45 thereon.

Fluid under pressure, as determined by the positioning of the valve plug 45 with respect to the valve seat 43, is delivered through the port 42 to the chamber 40. Fluid in the chamber 40 is delivered through the transmitted pressure or delivery connection 51. The pressure effective in the chamber 40 is also effective through the passageway 50 and in the chamber 24 against the underside of the diaphragm 12 as well as against the underside of the diaphragm 21. The nozzle opening at the nozzle 25 is controlled by the motion of the diaphragm 12, which as noted above, is exposed to the pressure of the process fluid on one side and to the transmitted fluid pressure on the other. The nozzle 25 exhausts into the chamber 24.

The nozzle back pressure, effective in the chamber 26 and in the passageway 27, varies as the position of the diaphragm surface of the diaphragm 12 moves with respect to the nozzle 25. This nozzle back pressure is directly effective on the small diaphragm area of the diaphragm 16 in the chamber 26 and is also effective through the passageway 27 and the restriction 33 to the chamber 31 where it is effective in the same direction against a much larger area represented by the difference of the effective areas in the chamber 31 of the diaphragm 16 and 18.

It will be noted that any change of the nozzle back pressure is immediately effective in the chamber 26 on the upper face of the diaphragm 16 and is effective in the chamber 31 with a delayed action because of the restriction 33 in the same direction against the upper face of the diaphragm 18. The total effect of the nozzle pressure on these areas of the diaphragm 16 and 18, one direct and the other delayed, is balanced at all times by the transmitted pressure fluid acting in the opposite direction on the lower face of the diaphragm 21 and on an effective area which may be and preferably is equal to that of the effective area of the diaphragm 18.

The spring 44 acts against the diaphragm assembly which includes the connector 35 in the same direction as the transmitted pressure so that the nozzle pressure is higher than the transmitted or output pressure by a constant amount. This pressure differential is effective at the nozzle 25 for producing flow at the nozzle 25 whenever it is uncovered by the diaphragm 12.

Unbalance of the diaphragm assembly, including the diaphragm connector 35 and the diaphragms 16, 18 and 21, connected thereby, operates to admit balancing fluid pressure through the supply restriction 30 from the supply connection 29, or to exhaust fluid past the valve seat 37 to the chamber 32 and thence to the atmosphere through the exhaust passageway 34, as required to restore a condition of balance.

It will be noted that the nozzle back pressure, as a measuring pressure, is effective directly on the upper face of the small diaphragm area in the chamber 26 and with a delayed action through the restriction 33 and within the chamber 31. While the nozzle pressure responds with a high order of sensitivity to motion of the diaphragm 12, the nozzle pressure is immediately effective only on a small fraction of the total area of the diaphragm system. The resulting motion of the diaphragm assembly and of the ports terminated at the valve seats 37 and 43 is small. The tendency of the transmitted pressure delivered through the fluid connection 51 to overshoot is thus avoided with attendant stability in the system.

In operation the delivered pressure at the fluid connection 51 actually undershoots the input pressure changes effective in the chamber 23 except for the gradual restoring action that occurs as the nozzle back pressure bleeds through the restriction 33, and gradually becomes effective on the full area of the diaphragm 18 equal and opposite to that of the diaphragm 21.

The size of the restriction 33 is made such that the rate at which the nozzle back pressure rebalances on the larger area will be well below the natural time constants of the system, including the effects of any inertia of the process fluid.

I claim:

1. In a fluid pressure transmitter, a supply fluid connection, a transmitted fluid connection, a process fluid connection, a pressure responsive member having said process fluid connection in communication with one side thereof and said transmitted fluid connection in communication with the other side thereof, valve means interposed between said supply fluid connection and said transmitted fluid connection, a pressure responsive device controlling said valve means having a first pressure responsive portion with which said transmitted fluid connection is in communication, said pressure responsive device having second and third pressure responsive portions opposed to said first portion, a pilot pressure circuit comprising a member having a restriction and a nozzle connected in series between the supply pressure connection and the transmitted pressure connection, said pressure responsive member being movable in spaced relation to said nozzle for establishing a pilot pressure, a fluid connection having a restriction therein communicating with said second pressure responsive portion for applying the pilot pressure thereagainst, and a fluid connection in communication with said third pressure responsive portion for applying the pilot pressure thereagainst.

2. In a fluid pressure transmitter, a housing, a supply fluid connection, a transmitted fluid connection, a process fluid connection, a pressure responsive member in said housing having said process fluid connection in communication with one side thereof and said transmitted fluid connection in communication with the other side thereof, valve means in said housing interposed between said supply fluid connection and said transmitted fluid connection, a pressure responsive device in said housing controlling said valve means having a first pressure responsive portion with which said transmitted fluid connection is in communication, said pressure responsive device having second and third pressure responsive portions opposed to said first portion, a pilot pressure circuit comprising a member having a restriction and a nozzle connected in series between the supply pressure connection and the transmitted pressure connection, said pressure responsive member being movable in spaced relation to said nozzle for establishing a pilot pressure, a fluid connection having a restriction therein communicating with said second pressure responsive portion for applying the pilot pressure thereagainst, and a fluid connection in communication with said third pressure responsive portion for applying the pilot pressure thereagainst.

3. In a fluid pressure transmitter, a supply fluid connection, a transmitted fluid connection, a process fluid connection, a pressure responsive member having said process fluid connection in communication with one side thereof and said transmitted fluid connection in communication with the other side thereof, valve means interposed between said supply fluid connection and said transmitted fluid connection, a pressure responsive device controlling said valve means, said pressure responsive device comprising a plurality of coaxial fluid pressure responsive members connected for simultaneous movement, and a pilot pressure circuit connected to said supply fluid connection and including a member controlled by said pressure responsive member for establishing a pilot pressure, a fluid connection for applying said pilot pressure on one of said coaxial fluid pressure responsive members, and a second fluid connection having a restriction therein for applying said pilot pressure on another of said coaxial fluid pressure responsive members.

4. In a fluid pressure transmitter, a supply fluid connection, a transmitted fluid connection, a process fluid connection, a pressure responsive member having said process fluid connection in communication with one side thereof and said transmitted fluid connection in communication with the other side thereof, valve means interposed between said supply fluid connection and said transmitted fluid connection, a pressure responsive device controlling said valve means, said pressure responsive device comprising a plurality of coaxial fluid pressure responsive members connected for simultaneous movement, and a pilot pressure circuit connected to said supply fluid connection and including a member controlled by said pressure responsive member for establishing a pilot pressure, and a fluid connection for applying said pilot pressure on one of said coaxial fluid pressure responsive members, a second fluid connection having a restriction therein for applying said pilot pressure on another of said coaxial fluid pressure responsive members in the same direction, and another fluid connection for establishing communication between said transmitted fluid connection and another of said fluid pressure responsive members in the opposite direction.

5. In a fluid pressure transmitter, a supply fluid connection, a transmitted fluid connection, a process fluid connection, a pressure responsive member having said fluid connection in communication with one side thereof and said transmitted fluid connection in communication with the other side thereof, valve means interposed between said supply fluid connection and said transmitted fluid connection, a pressure responsive device controlling said valve means, said pressure responsive device comprising a plurality of coaxial fluid pressure responsive members connected for simultaneous movement, and a pilot pressure circuit connected to said supply fluid connection and including a nozzle, said pressure responsive member being movable in spaced relation to said nozzle for establishing a pilot pressure, and a fluid connection for applying said pilot pressure on one of said coaxial fluid pressure responsive members, and a second fluid connection having a restriction therein for applying said pilot pressure on another of said coaxial fluid pressure responsive members.

References Cited in the file of this patent
UNITED STATES PATENTS

| 2,516,333 | Moore | July 25, 1950 |
| 2,635,618 | Moore | Apr. 21, 1953 |
| 2,706,466 | Rosenberger | Apr. 19, 1955 |